US009116715B2

(12) United States Patent
von Eicken et al.

(10) Patent No.: US 9,116,715 B2
(45) Date of Patent: Aug. 25, 2015

(54) SYSTEMS AND METHODS FOR EFFICIENTLY BOOTING AND CONFIGURING VIRTUAL SERVERS

(75) Inventors: Thorsten von Eicken, Santa Barbara, CA (US); Rafael Saavedra, Santa Barbara, CA (US)

(73) Assignee: RightScale, Inc., Santa Barbara, CA (US)

( * ) Notice: Subject to any disclaimer, the term of this patent is extended or adjusted under 35 U.S.C. 154(b) by 1343 days.

(21) Appl. No.: 12/025,519

(22) Filed: Feb. 4, 2008

(65) Prior Publication Data

US 2009/0199116 A1 Aug. 6, 2009

(51) Int. Cl.
*G06F 15/16* (2006.01)
*G06F 9/44* (2006.01)
*G06F 9/445* (2006.01)
*G06F 9/455* (2006.01)
*H04L 29/00* (2006.01)

(52) U.S. Cl.
CPC ............... *G06F 9/4416* (2013.01); *G06F 8/63* (2013.01); *G06F 9/45533* (2013.01); *G06F 2009/45562* (2013.01); *H04L 29/00* (2013.01)

(58) Field of Classification Search
CPC ............... H04L 29/00; G06F 9/45533; G06F 2009/45562; G06F 8/63; G06F 9/4416
USPC ........................................................ 709/222
See application file for complete search history.

(56) References Cited

U.S. PATENT DOCUMENTS

| 6,598,075 | B1 | 7/2003 | Ogdon et al. |
| 6,973,587 | B1 * | 12/2005 | Maity et al. ................... 714/6.31 |
| 6,978,232 | B1 | 12/2005 | Tobler |
| 7,080,378 | B1 * | 7/2006 | Noland et al. ................. 718/104 |
| 7,085,921 | B2 | 8/2006 | Frye, Jr. |
| 7,102,996 | B1 * | 9/2006 | Amdahl et al. ............... 370/230 |
| 7,139,728 | B2 * | 11/2006 | Rigole ......................... 705/7.31 |
| 7,200,622 | B2 * | 4/2007 | Nakatani et al. .............. 707/823 |
| 7,299,276 | B1 | 11/2007 | Strawn |
| 7,318,100 | B2 * | 1/2008 | Demmer et al. .............. 709/229 |
| 7,356,679 | B1 * | 4/2008 | Le et al. ............................ 713/1 |

(Continued)

FOREIGN PATENT DOCUMENTS

| WO | WO 2004059503 A1 * | 7/2004 |
| WO | WO-2008112698 A2 | 9/2008 |

OTHER PUBLICATIONS

International Search Report from PCT/US2009/036764, mailed Jun. 7, 2009, 3 pages.

(Continued)

*Primary Examiner* — Krista Zele
*Assistant Examiner* — Anthony Fabbri
(74) *Attorney, Agent, or Firm* — John D. Lanza; Foley & Lardner LLP

(57) ABSTRACT

Techniques for providing faster and more efficient ways to deploy virtual server configurations in a hosted virtual server service are described. Broadly, a base machine image is created with essential or standard virtual server functionality, and a configuration manager, which allows the virtual server to be customized after instantiation. This post-instantiation customization, which can include network or system parameters, software upgrades or modifications, role specification, specification of locations of other virtual servers, software installation, and loading of application data, allows virtual servers to be customized without the need for separate machine images for each virtual server instance.

21 Claims, 5 Drawing Sheets

(56) References Cited

U.S. PATENT DOCUMENTS

| | | | |
|---|---|---|---|
| 7,383,327 B1 | 6/2008 | Tormasov et al. | |
| 7,433,935 B1* | 10/2008 | Obert | 709/219 |
| 7,702,971 B2 | 4/2010 | Nguyen et al. | |
| 8,296,759 B1* | 10/2012 | Hutchins et al. | 718/1 |
| 8,464,250 B1* | 6/2013 | Ansel | 718/1 |
| 2001/0047415 A1* | 11/2001 | Skene et al. | 709/226 |
| 2001/0052016 A1* | 12/2001 | Skene et al. | 709/226 |
| 2003/0105810 A1* | 6/2003 | McCrory et al. | 709/203 |
| 2003/0149755 A1* | 8/2003 | Sadot | 709/223 |
| 2003/0217131 A1* | 11/2003 | Hodge et al. | 709/223 |
| 2004/0078467 A1* | 4/2004 | Grosner et al. | 709/226 |
| 2004/0103150 A1 | 5/2004 | Ogdon et al. | |
| 2004/0221146 A1* | 11/2004 | Baumann | 713/1 |
| 2005/0120160 A1 | 6/2005 | Plouffe et al. | |
| 2005/0229175 A1* | 10/2005 | McCrory et al. | 717/177 |
| 2006/0069761 A1* | 3/2006 | Singh et al. | 709/222 |
| 2006/0143247 A1* | 6/2006 | Poole et al. | 707/204 |
| 2006/0184653 A1* | 8/2006 | van Riel | 709/222 |
| 2006/0271930 A1* | 11/2006 | Letizi et al. | 718/1 |
| 2007/0008974 A1* | 1/2007 | Dispensa et al. | 370/392 |
| 2007/0011685 A1* | 1/2007 | Yim et al. | 718/105 |
| 2007/0179955 A1 | 8/2007 | Croft et al. | |
| 2007/0233455 A1* | 10/2007 | Zimmer et al. | 703/27 |
| 2007/0234346 A1* | 10/2007 | Kramer et al. | 717/174 |
| 2007/0250608 A1* | 10/2007 | Watt | 709/222 |
| 2007/0258388 A1* | 11/2007 | Bose | 370/254 |
| 2007/0294669 A1* | 12/2007 | Robalewski et al. | 717/120 |
| 2008/0034416 A1 | 2/2008 | Kumar et al. | |
| 2008/0049786 A1* | 2/2008 | Ram et al. | 370/468 |
| 2008/0091792 A1* | 4/2008 | Mei et al. | 709/217 |
| 2008/0104588 A1* | 5/2008 | Barber et al. | 718/1 |
| 2008/0235445 A1* | 9/2008 | Kacin et al. | 711/112 |
| 2009/0327675 A1 | 12/2009 | Cherian et al. | |

OTHER PUBLICATIONS

Written Opinion of the International Searching Authority, from PCT/US2009/036764, dated Jun. 7, 2009, 6 pages.
International Preliminary Report on Patentability from PCT/US09/036764, mailed on Sep. 21, 2010, 1 page.
Written Opinion of the International Searching Authority, from PCT/US09/036764, dated Sep. 21, 5 pages.
Australian Examination Report on 2009225796 dated Mar. 14, 2013.
Notice of Allowance on U.S. Appl. No. 12/050,865 dated Jun. 12, 2013.
Notice of Allowance on U.S. Appl. No. 13/452,740 dated Jun. 21, 2013.
Notice of Allowance on U.S. Appl. No. 13/538,820 dated Oct. 24, 2013.
Office Action on U.S. Appl. No. 12/050,865 dated Feb. 14, 2012.
Office Action on U.S. Appl. No. 12/050,865 dated Feb. 18, 2011.
Office Action on U.S. Appl. No. 12/050,865 dated Aug. 14, 2012.
Office Action on U.S. Appl. No. 12/050,865 dated Aug. 2, 2011.
Office Action on U.S. Appl. No. 13/452,740 dated Oct. 4, 2012.
Office Action on U.S. Appl. No. 13/452,740 dated Nov. 27, 2012.
Office Action on U.S. Appl. No. 13/452,740 dated Apr. 15, 2013.
Office Action on U.S. Appl. No. 13/538,820 dated Oct. 4, 2012.
Office Action on U.S. Appl. No. 13/538,820 dated Nov. 20, 2012.
Office Action on U.S. Appl. No. 13/538,820 dated Apr. 15, 2013.
Office Action on U.S. Appl. No. 13/538,820 dated Jun. 17, 2013.
Singapore Written Opinion on 201006680-1 dated Mar. 14, 2012.
Singapore Written Opinion on 201006680-1 dated Aug. 23, 2011.

* cited by examiner

SYSTEMS AND METHODS FOR EFFICIENTLY BOOTING AND CONFIGURING VIRTUAL SERVERS

BACKGROUND OF THE INVENTION

Hosted virtual server services allow users to instantiate virtual servers running software specified by the users without requiring a customer to own or manage the hardware underlying the virtual server instances. Virtual server services, including, for example, Amazon EC2, may enable users to instantiate a number of virtual servers of a variety of different configurations to match their needs.

Many virtual server services allow instantiation of virtual servers from bootable images provided by users. These images may contain the set of desired server software of the users. However, these virtual server images may require substantial time and effort to build, even when only minor changes to a virtual server's functionality are sought.

SUMMARY OF THE INVENTION

The present invention is related to providing faster and more efficient ways to deploy virtual server configurations in a hosted virtual server service. Broadly, a base machine image is created with essential or standard virtual server functionality, and a configuration manager, which allows the virtual server to be customized after instantiation. This post-instantiation customization, which can include network or system parameters, software upgrades or modifications, role specification, specification of locations of other virtual servers, software installation, and loading of application data, allows virtual servers to be customized without the need for separate machine images for each virtual server instance.

In one aspect, the present invention relates to a method for facilitating the creation of configurable virtual server instances from machine images. In one embodiment, a method includes: generating a base machine image, the base machine image comprising a bootable subset of desired virtual server capabilities and a configuration manager; transmitting instructions to instantiate the base machine image on at least one virtual server; determining the configuration manager of the instantiated virtual server is ready to receive configuration information; and transmitting, to the configuration manager, configuration information for the instantiated virtual server.

In another aspect, the present invention relates to a system for facilitating the creation of configurable virtual server instances from machine images. In one embodiment, the system includes: a first computing device which generates a base machine image, the base machine image comprising a bootable subset of desired virtual server capabilities and a configuration manager; and transmits, to a second computing device, instructions to instantiate the base machine image on at least one virtual server; and a third computing device which receives, from the configuration manager of the instantiated virtual server, a request for configuration information; and transmits, to the configuration manager, configuration information for the instantiated virtual server.

In a third aspect, the present invention relates to a method for loading a dynamically configurable virtual server instance. In one embodiment, a method includes: receiving, by a computing device, a base machine image, the base machine image comprising a bootable subset of desired virtual server capabilities and a configuration manager; instantiating, by the computing device, a virtual server comprising the base machine image; executing, by the computing device, the configuration manager to transmit a request for configuration information; receiving, by the computing device, the configuration information; and implementing, by the configuration manager, the configuration information on the virtual server.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1:
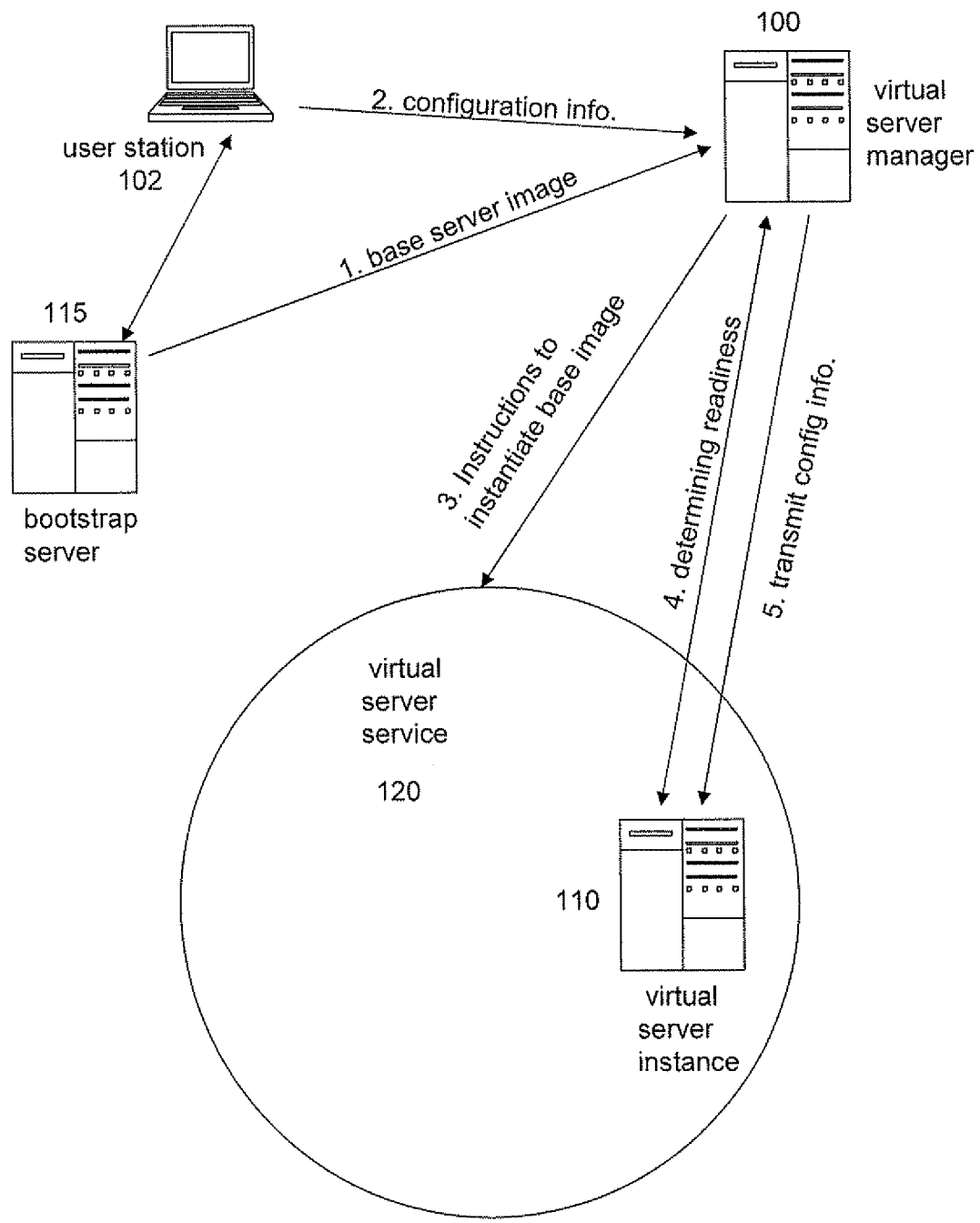
FIG. 1 is a block diagram of one embodiment of a network setting enabling the creation of configurable virtual server instances from machine images.

Referring now to FIG. 1, one embodiment of a network setting enabling the creation of configurable virtual server instances from machine images is shown. In brief overview, a user station 102 accepts input from a user specifying a boot image, which is created on a bootstrap server 115. The base server image is then sent to a virtual server manager 100. At a separate time, configuration information may be received from the user station 102 or a different user station 102. The virtual server manager 100 (also referred to herein as simply a "manager") sends the virtual server service 120 instructions to instantiate an instance of the boot image. After determining the instance 110 is ready, the manager 100 sends the received configuration information to the virtual server instance. In this manner, configuration of a virtual server instance is decoupled from the process of building a server image.

Still referring to FIG. 1, now in greater detail, a user station 102 may provide any functionality for a user to create boot images for virtual servers. In some embodiments, the user station 102 may be coupled with a bootstrap server 115 which compiles or otherwise generates the virtual server images. In other embodiments, the virtual server images may be created on the user station 102 itself. Both the user station 102 and bootstrap server 115 may comprise any computing devices.

The virtual server manager 100 may comprise any computer device capable of receiving one or more virtual server images and accompanying configuration information. In some embodiments, the virtual server manager may comprise a single server; in other embodiments, the virtual server manager 100 may comprise a server cluster. In some embodiments, the manager 100 may have one or more associated databases for storing configuration information and/or virtual server images. These databases may be segregated by user, such that different users of the manager 100 can store various images without interfering with images stored by other users. In some embodiments, users may be permitted to share images and/or configuration information stored on a manager 100.

In some embodiments, the virtual server manager 100 may be operated on a subscription basis. For example, a company may charge users to store one or more images on the manager, and to use the manager to instantiate one or more servers on the hosted service. In some embodiments, the virtual server manager 100 may be operated by an entity independent from the virtual server service. In some embodiments, the user station may communicate with the manager 100 via a web interface. For example, a manager 100 may provide a web interface for a number of companies to manage their virtual server deployments on a hosted virtual server service. For example, a company running the manager 100 may charge a flat fee for a company to use the services of the manager 100 in initiating virtual servers. Or for example, a company running the manager 100 may charge a pro-rated fee based on how many base images or configuration profiles are created and/or stored using the manager 100. Or for example, a company running the manager 100 may charge a monthly fee for use of the control features offered by the manager in operating and instantiating virtual servers. Or for example, a company running the manager 100 may charge a fee based on the amount of time any virtual servers managed are running.

A virtual server service 120 may comprise any service allowing one or more users to instantiate virtual servers on resources hosted by the virtual server service 120. Examples of virtual server services include the EC2 service offered by Amazon, Inc. and FLEXISCALE, offered by XCalibre Communications Ltd. In some embodiments, a manager 100 may be specifically designed to work with a single virtual server service. In other embodiments, a manager 100 may provide an interface to a plurality of virtual server services.

The user station, manager 100, and virtual server service 120 may be connected in any manner, and via any network or networks. Connections and networks included in the connections may comprise the Internet, local networks, web servers, file servers, routers, databases, computers, servers, network appliances, or any other computing devices capable of sending and receiving information. A network may comprise computing devices connected via cables, infrared ports, wireless signals, or any other means of connecting multiple computing devices. A network and any devices connected to the networks may communicate via any communication protocol used to communicate among or within computing devices, including without limitation SSL, BitTorrent, HTML, XML, RDP, ICA, FTP, HTTP, SIP, XMPP (also known as Jabber), TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, WiMax and direct asynchronous connections, or any combination and/or extensions thereof. The network may comprise mobile telephone networks utilizing any protocol or protocols used to communicate among mobile devices, including AMPS, TDMA, CDMA, GSM, GPRS or UMTS.

Figure 2A:
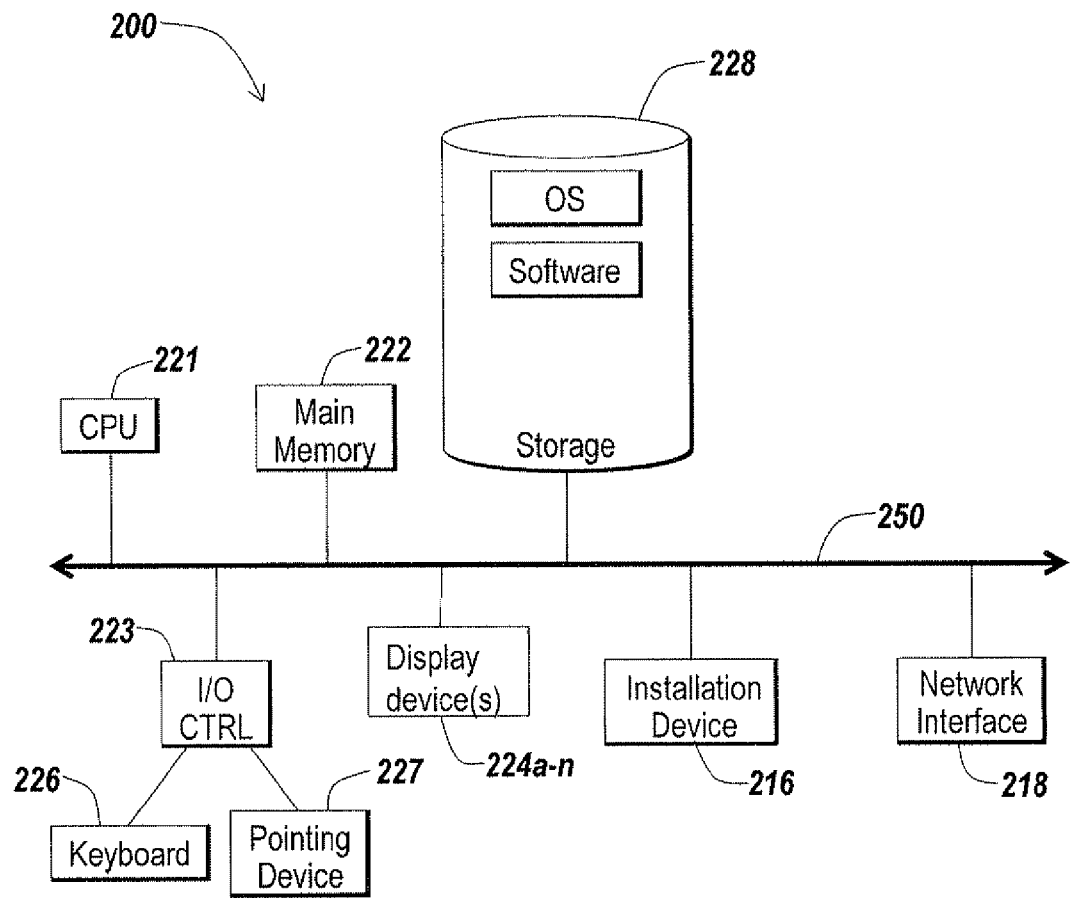
FIGS. 2A and 2B are block diagrams of a typical computer 200 useful as client computing devices and server computing devices.
Figure 2B:
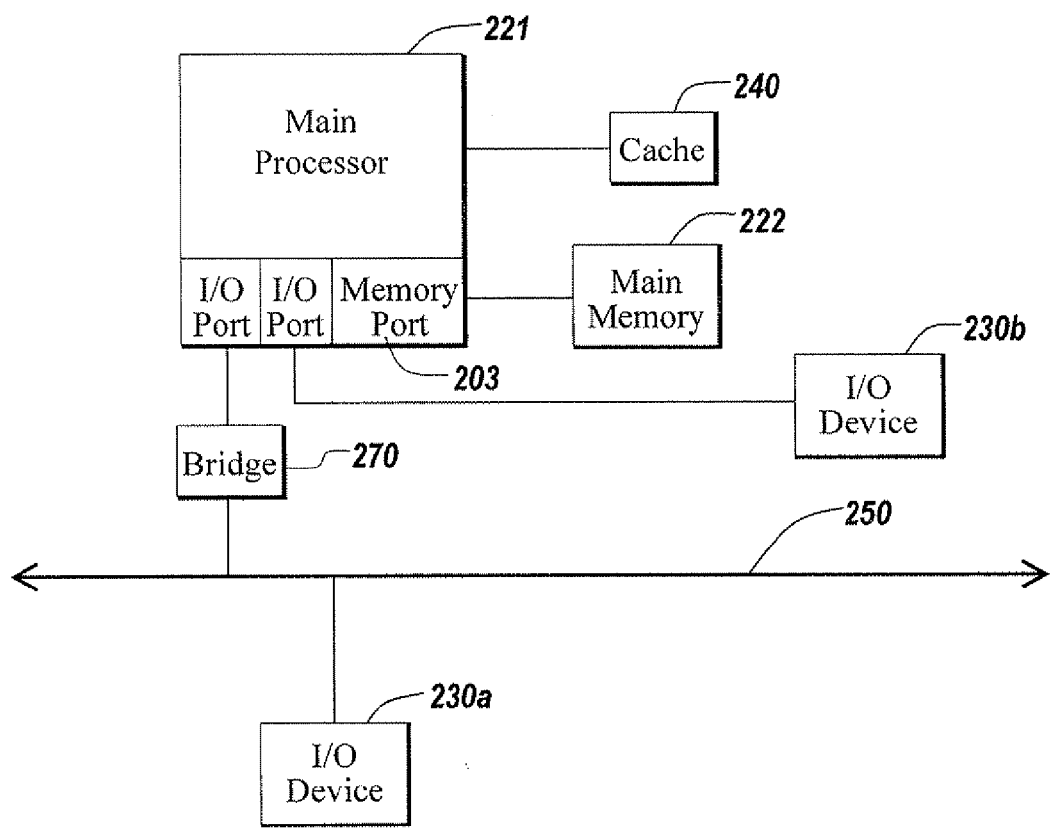

FIGS. 2A and 2B depict block diagrams of a computing device 200 useful for practicing an embodiment of the client 102 or a server. A client 102 and server may be deployed as and/or executed on any type and form of computing device, such as a computer, network device or appliance capable of communicating on any type and form of network and performing the operations described herein. As shown in FIGS. 2A and 2B, each computing device 200 includes a central processing unit 221, and a main memory unit 222. As shown in FIG. 2A, a computing device 200 may include a visual display device 224, a keyboard 226 and/or a pointing device 227, such as a mouse. As shown in FIG. 2B, each computing device 200 may also include additional optional elements, such as one or more input/output devices 230*a*-230*b* (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 222 may be one or more memory chips capable of storing data and allowing any storage location to be directly accessed by the microprocessor 221 such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC200 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 221 communicates with main memory 222 via a system bus 250 (described in more detail below). FIG. 2B depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 221 may use an Advanced Graphics Port (AGP) to communicate with the display 224. FIG. 2B depicts an embodiment of a computer 200 in which the main processor 221 communicates directly with I/O device 230*b* via HyperTransport, Rapid I/O, or InfiniBand. FIG. 2B also depicts an embodiment in which local busses and direct communication are mixed: the processor 221 communicates with I/O device 230*a* using a local interconnect bus while communicating with I/O device 230*b* directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 200 may further comprise a storage device, such as one or more hard disk drives or redundant arrays of independent disks, Flash memory, or EEPROMs, for storing an operating system and other related software, and for storing application software programs. Optionally, any of the installation devices 216 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols. In one embodiment, the computing device 200 communicates with other computing devices 200' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

A wide variety of I/O devices 230a-230n may be present in the computing device 200. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 230a-230n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 200 of the sort depicted in FIGS. 2A and 2B typically operates under the control of operating systems, which control scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 102 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. In still other embodiments, a mobile device may comprise a mobile gaming device with wireless communication capability. A typical mobile device may comprise many of the elements described above in FIGS. 2A and 2B, including the processor and the main memory.

Figure 3:
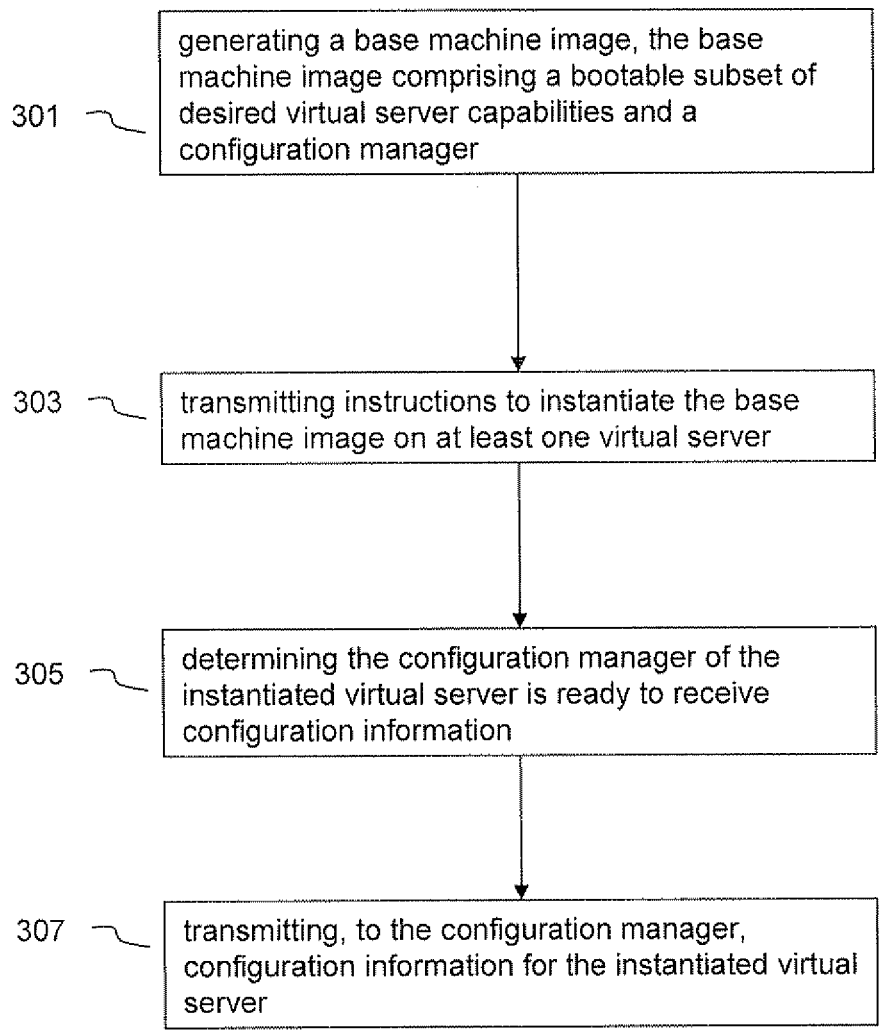
FIG. 3 is a flow diagram illustrating a method for facilitating the creation of configurable virtual server instances from machine images.

Referring now to FIG. 3, a flow diagram illustrating a method for facilitating the creation of configurable virtual server instances from machine images is shown. In brief overview, the method comprises: generating a base machine image, the base machine image comprising a bootable subset of desired virtual server capabilities and a configuration manager (step 301); transmitting instructions to instantiate the base machine image on at least one virtual server (step 303); determining the configuration manager of the instantiated virtual server is ready to receive configuration information (step 305); and transmitting, to the configuration manager, configuration information for the instantiated virtual server (step 307).

Still referring to FIG. 3, now in greater detail, a base machine image having a bootable subset of desired virtual server capabilities and a configuration manager may be created in any manner (step 301). The bootable subset may comprise any subset of virtual server capabilities, including without limitation an operating system, HTTP server, file unzipping/unpacking utilities, scripting language support, and encryption/decryption utilities. In some embodiments, a machine image may be created by including the configuration manager in the build process including the virtual server capabilities. In other embodiments, a machine image may be created by modifying an existing machine image. In these embodiments, a configuration manager may be already present on a running virtual server booted from that machine image or one may be installed, and then a new machine image may be taken of the running virtual server.

The configuration manager may comprise any utilities for configuring a virtual server after instantiation. In some embodiments, a single configuration manager may be provided by a manager 100 for users to select to include within the machine image. In other embodiments, a plurality of configuration managers may be offered. A plurality of configuration managers may be used to support enhancements to the configuration manager while retaining old versions to ensure existing server configurations work exactly as before. A plurality of configuration managers may also be used to support multiple operating systems (e.g. Linux, FreeBSD, Solaris) or to support multiple versions of one operating system (e.g. RedHat Linux, Debian Linux, and Ubuntu Linux; or Solaris 10 and OpenSolaris).

In some embodiments, a user may be allowed to create a number of different machine images. For example, a user may want to create a number of virtual server base machine images, each with a different operating system. The user then may use each of these images to create customized virtual server instances running on each of the operating systems.

After the base machine image is created, instructions to instantiate the base machine image on at least one virtual server may be transmitted in any manner (step 303). In some embodiments, the instructions may be transmitted from a manager 100 to a virtual server service 120. In some embodiments, this transmission may be initiated by a user. For example, a manager 100 may provide a web page by which a user can access and manage a number of virtual servers on one or more virtual server services. The user can send, through the manager 100, instructions to instantiate a particular machine image. The manager 100 may then select the appropriate base image and send instructions to the virtual server service to instantiate the image.

In some embodiments, the instructions to instantiate the virtual server may be sent automatically. In these embodiments, any configuration or monitoring data either from the virtual server itself, other servers, the manager 100 or any combinations of the aforementioned data can be used to trigger the sending of instructions. For example, a manager 100 may have instructions to automatically instantiate a given machine image if usage, load, or utilization of a number of servers exceeds a threshold, or if a given virtual server fails.

In some embodiments, the instantiation instructions may comprise one or more parameters for the to-be-instantiated server. For example, the instantiation instructions may include a serial number or other identifier so that a manager 100 can identify the particular instantiation later. Or for example, the instantiation instructions may include an address for the manager 100 so that the newly instantiated server will have an address to connect to upon instantiation.

After transmitting the instructions, a manager 100 may determine the configuration manager of the instantiated virtual server is ready to receive configuration information in any manner (step 305). In some embodiments, the manager 100 may wait to receive a connection request form the instantiated server. In other embodiments, the manager 100 may periodically request a connection to the instantiated server until it succeeds. In some embodiments, the manager 100 may monitor the status of the instantiated server using a service provided through the hosted virtual server service.

In one embodiment, the instantiated server may initiate an HTTPS session with the manager 100. The instantiated server may pass to the manager 100 a serial number given to it, along with a current state of the machine. The manager 100 may then verify that the serial number corresponds to a serial number the manager sent instructions to instantiate. In other embodiments, the instantiated virtual server may be identified by any other means, including a TCP/IP source address and/or a hosted virtual server service identifier given to the instance.

After readiness is determined, configuration information for the instantiated virtual server may be transmitted in any manner (step 307). In one embodiment, the configuration information may be transmitted from the manager 100.

The configuration information may comprise any information which may be used by the virtual server instance to function, including without limitation, executables, files, parameters, and locations and types of other virtual server instances. In one embodiment, the configuration information transmitted may comprise an ordered list of executable scripts, a list of URLs pointing to files corresponding to each script, and a set of input variable bindings which may be used and accessed by the scripts during their execution. In this embodiment, the files corresponding to each script may comprise any files utilized by each script, including without limitation configuration files, application packages to install, executable files, and application data (e.g. a database snapshot).

After the configuration information is transmitted, the virtual server instance may then take any steps necessary to implement the received configuration information. The example below continues the embodiment described above in which a manager 100 has transmitted an ordered list of executable scripts, a list of URLs pointing to files corresponding to each script, and a set of input variable bindings.

An instance may first place each script into an executable file in the local filesystem, and download each attachment named in the configuration file from the provided URL to also store in the local filesystem. The attachments may each be stored in a separate directory for each script. Each script may then be run in turn, with each script passed the input variable bindings required by the script. These bindings may include a number of global variables, such as the machine image id, the instance id, the IP addresses assigned to the instance, and the location of the attachments for the script. If any errors occur (e.g. a script exits with an error) the process may be aborted.

In some embodiments, the execution of the configuration process may itself be determined by earlier steps in the configuration process. For example, a configuration script may produce an input parameter used in a later configuration script. Or, for example, a configuration script may execute to determine which of a set of configuration scripts should be executed, and in what order. In some embodiments, a configuration process may specify that one or more other virtual servers be launched, terminated, or otherwise affected based on the configuration process. In these embodiments, the virtual server executing the configuration process may send signals directly to the servers affected, or the virtual server may send instructions to a manager 100.

After configuration is complete, an instance may signal the manager 100 the outcome of the configuration process, which is "success" if all scripts executed without error, and "stranded" if a script exited with an error. This signaling may be done via any manner, and may use the same method and/or connection used to transfer the configuration information. In addition, for troubleshooting purposes the instance may transmit any number of configuration status updates, including, for example, the UNIX standard output and error output of each script.

To give another configuration example, when deploying multi-server configurations it is often necessary to configure one server with information that depends on the state of the second server. For example, the first server may need to connect to the second server and for this purpose it may need to know the IP address of the second server. In these cases, particular challenges may be faced if the first and second servers are launched substantially simultaneously, or if the two servers have mutual dependencies (in such a case a deadlock may occur if both servers have to wait for information from the other server before producing the information the other server needs). Such inter-server dependencies may be handled by transmitting to the configuration manager incomplete information. Specifically, certain inputs may be marked as "missing." The configuration manager proceeds with the configuration steps but checks for the presence of all required inputs before running each specific script. If one or multiple inputs are missing, the configuration manager transmits any state information it may have to the manager 100 and then periodically queries the manager 100 for the missing input values. When it receives the missing values, it proceeds running the scripts.

In multi-server configurations, the dependencies between servers may change over time. Continuing the above example, if the second server fails and a replacement server is launched, then the configuration of the first server needs to be changed to update the dependent information. In addition, certain processes may need to be signaled or restarted so they re-read the configuration information. In one embodiment, after the initial configuration the configuration manager can poll the manager 100 periodically to inquire whether any reconfiguration actions are required. If so, the manager's 100 response to the poll may contain configuration information similar to the type transmitted at boot time and the configuration manager executes the requested scripts in the same manner to update the virtual server configuration. In another embodiment, instead of having the configuration manager poll periodically, the manager 100 can open a connection to the server to send the required information.

Figure 4:
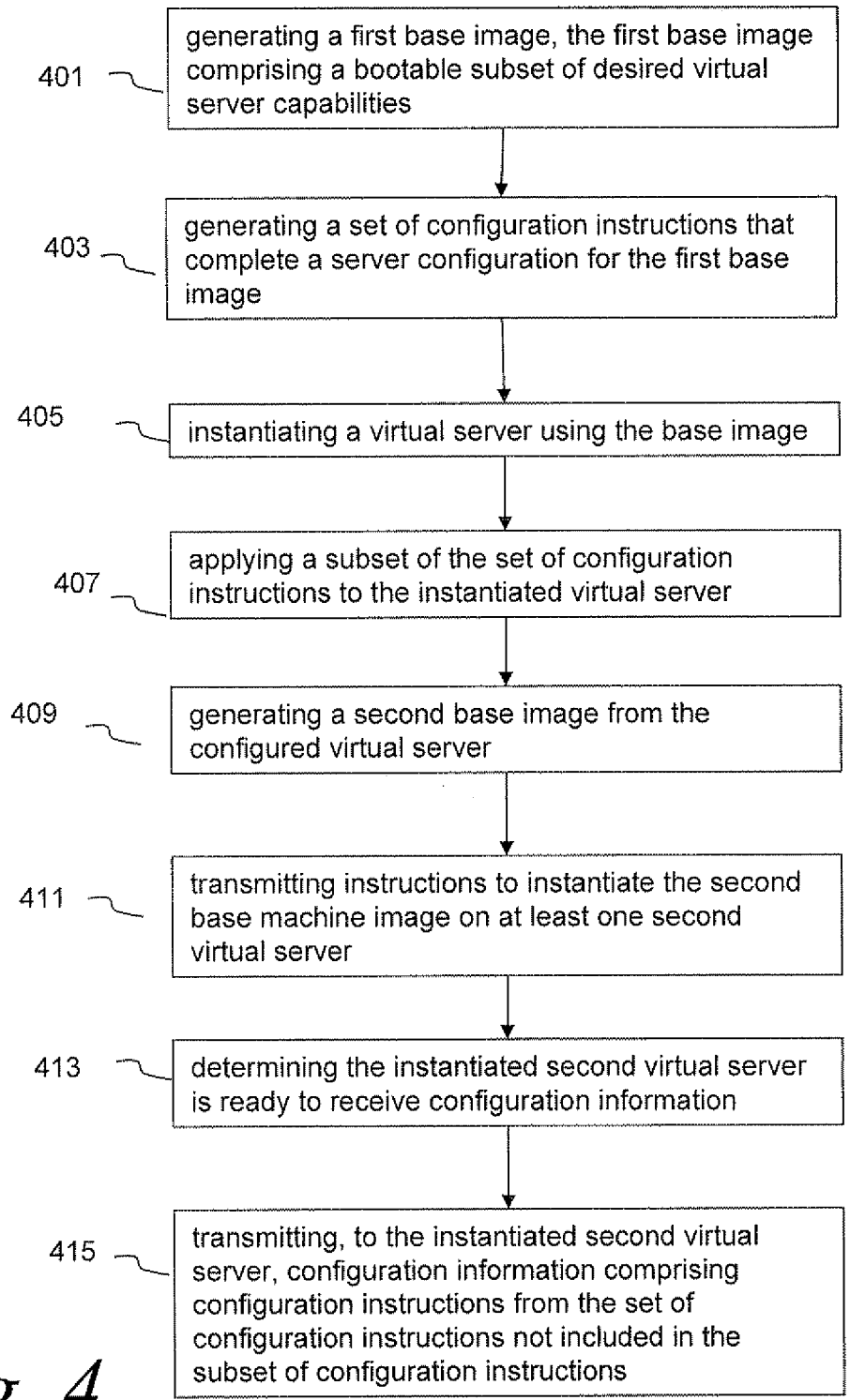
FIG. 4 is a flow diagram of one embodiment of a method for reducing the time taken to create configurable virtual server instances from machine images.

Now referring to FIG. 4, a flow diagram of one embodiment of a method for reducing the time taken to create configurable virtual server instances from machine images is shown. In brief overview, the method comprises: generating a first base image, the first base image comprising a bootable subset of desired virtual server capabilities (step 401); generating a set of configuration instructions that complete a server configuration for the first base image (step 403); instantiating a virtual server using the base image (step 405); applying a subset of the set of configuration instructions to the instantiated virtual server (step 407); generating a second base image from the configured virtual server (step 409); transmitting instructions to instantiate the second base machine image on at least one second virtual server (step 411); determining the instantiated second virtual server is ready to receive configuration information (step 413); and transmitting, to the instantiated second virtual server, configuration information comprising configuration instructions from the set of configuration instructions not included in the subset of configuration instructions (step 415).

Still referring to FIG. 4, now in greater detail, the process of instantiating virtual servers using a manager 100 as described above may take additional time depending on the amount of configuration information to be transmitted and the number of scripts to be run. Thus it may be desirable to create base images which have built in a subset of the configuration information. The method shown in FIG. 4 may be used to efficiently produce and instantiate such modified base images.

A first base image, the first base image comprising a bootable subset of desired virtual server capabilities, may be generated using any method. (step 401). The first base image may be created using any of the techniques described above.

A set of configuration instructions that complete a server configuration for the first base image may be generated in any manner (step 403). The set of configuration instructions may comprise any of the configuration information described herein, including without limitation scripts, parameters, and associated files. In some embodiments, the configuration instructions may be generated automatically in response to user input specifying a desired configuration. In some embodiments, the configuration instructions may be generated by a manager 100 in response to receiving user input via a web interface.

A virtual server may then be instantiated using the base image in any manner (step 405). In some embodiments, the virtual server may be instantiated on a hosted virtual server service. In other embodiments, the virtual server may be instantiated in a test or build environment. In still other embodiments, the virtual server may be instantiated on a manager 100.

After instantiation, a subset of the set of configuration instructions may be applied to the instantiated virtual server (step 407). In some embodiments, a manager 100 may transmit the subset of configuration instructions to the instantiated virtual server. The subset of the set of configuration instructions may be chosen in any manner. In some embodiments, a user may select the subset. In some embodiments, the subset may be selected based on how common the instructions in the subset are. For example, the subset may comprise the most commonly used configuration instructions. In other embodiments, the subset may be selected based on how quickly the instructions can be executed by an instantiated virtual server. For example, the subset may comprise the configurations instructions that take the longest to be executed by a virtual server.

A second base image may then be generated from the configured virtual server (step 409). The second base image may be produced by any technique for generating a base image. In some embodiments, the configured virtual server may suspend or stop execution while a copy is made of the executable code and accompanying files comprising the configured virtual server.

Instructions to instantiate the second base machine image on at least one second virtual server may then be transmitted (step 411). In one embodiment, the instructions to instantiate the second base machine image may be transmitted from a manager 100 to a hosted virtual server service. For example, the instructions may be transmitted to a hosted virtual server service either in direct response to a user request or as part of an automatic instantiation process set up by a user.

A manager 100 may then determine the instantiated second virtual server is ready to receive configuration information (step 413). This determination may be made using any technique or system described herein, including for example, receiving a transmission from a configuration manager executing in the second virtual server.

After the determination, a manager 100 may transmit, to the instantiated second virtual server, configuration information comprising configuration instructions from the set of configuration instructions not included in the subset of configuration instructions (step 415). Transmission of configuration instructions may be done in any manner and using any protocol or protocols. After the second virtual server receives the configuration instructions, the second virtual server may apply the configuration instructions using any technique described herein.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A method for facilitating the creation of configurable virtual server instances from machine images, the method comprising:

a. generating a first bootable base machine image, specifying a subset of desired virtual server capabilities and a configuration manager;
  b. transmitting first instructions to a virtual server service to instantiate a first virtual server, wherein the first virtual server includes: (i) a first instantiation of the subset of desired virtual server capabilities specified by the first bootable base machine image and (ii) a first instantiation of the configuration manager specified by the first bootable base machine image;
  c. determining that the first instantiation of the configuration manager of the instantiated first virtual server is ready to receive first configuration information;
  d. transmitting, to the first instantiation of the configuration manager, first configuration information to configure with first functionality the first instantiated virtual server;
  e. generating a second bootable base machine image from the configured first instantiated virtual server, wherein the second bootable base machine image specifies the subset of desired virtual capabilities and the configuration manager;
  f. transmitting second instructions to the virtual server service to instantiate a second virtual server, wherein the second virtual server includes: (i) a second instantiation of the subset of desired virtual server capabilities specified by the second bootable base machine image, (ii) a second instantiation of the configuration manager specified by the second bootable base machine image, and (iii) the first functionality;
  g. determining that the second instantiation of the configuration manager of the instantiated second virtual server is ready to receive second configuration information;
  h. transmitting, to the second instantiation of the configuration manager, second configuration information to configure the second instantiated virtual server to replace the first functionality with second functionality that is different from the first functionality.

2. The method of claim 1, wherein step (b) further comprises transmitting first instructions to a virtual server management service to instantiate the first virtual server.

3. The method of claim 1, wherein step (d) comprises transmitting, to the first instantiation of the configuration manager, first configuration information to configure with first functionality the first instantiated virtual server, the configuration information selected based upon a source IP address or key of the instantiated virtual server.

4. The method of claim 1, wherein the transmitted first configuration information comprises at least one script.

5. The method of claim 4, wherein the script comprises executable instructions for downloading at least one file.

6. The method of claim 4, wherein the configuration information comprises at least one attached file.

7. The method of claim 1, further comprising displaying a user interface, the user interface accepting input from a user specifying the bootable subset of desired virtual server capabilities and accepting input of the first configuration information to be transmitted to the first instantiated virtual server.

8. The method of claim 1, wherein step (c) comprises receiving a request from the first configuration manager of the first instantiated virtual server for configuration information.

9. The method of claim 1, wherein step (c) comprises receiving an indication from a service instantiating the first bootable base machine image that the instantiation is complete.

10. The method of claim 1, wherein step (d) comprises transmitting, to the first instantiation of the configuration manager, first configuration information for the first instantiated virtual server, the configuration information dependent on the state of at least one other virtual server.

11. The method of claim 1, wherein step (b) comprises transmitting first instructions to a virtual server management service to instantiate a first virtual server; and further comprising displaying a user interface, the user interface accepting input from a user specifying the bootable subset of desired virtual server capabilities and accepting input of first configuration information to be transmitted to the first instantiated virtual server; and embodying the configuration information in at least one script.

12. The method of claim 1, further comprising the steps of
 i. determining that the second virtual server is to be reconfigured based on a state of the first virtual server;
 j. transmitting, to the second virtual server, configuration information dependent on the state of the first virtual server.

13. A system for facilitating the creation of configurable virtual server instances from machine images, the system comprising:
 a machine image generator creating a first bootable base machine image comprising a subset of desired virtual server capabilities and a configuration manager;
 a transmitter sending to a second computing device, instructions to instantiate a first virtual server, wherein the first virtual server includes: (i) a first instantiation of the subset of desired virtual server capabilities specified by the first bootable base machine image and (ii) a first instantiation of the configuration manager specified by the first bootable base machine image,
 generate a second bootable base machine image from the configured first instantiated virtual server, wherein the second bootable base machine image specifies the subset of desired virtual capabilities and the configuration manager; and
 instantiate a second virtual server, wherein the second virtual server includes: (i) a second instantiation of the subset of desired virtual server capabilities specified by the second bootable base machine image and (ii) a second instantiation of the configuration manager specified by the second bootable base machine image; and
 a receiver receiving, from the first instantiation of the configuration manager of the instantiated first virtual server, a request for first configuration information and receiving from the second instantiation of the configuration manager of the instantiated second virtual server a request for second configuration information;
 wherein the transmitter transmits first configuration information to configure with the first instantiated first virtual server with first functionality, and transmits second configuration information to configure the second instantiated virtual server with second functionality that is different from the first functionality.

14. The system of claim 13, wherein the second computing device executes the first instantiation of the first bootable base machine image and the first instantiation of the configuration manager to process the received configuration information.

15. The system of claim 13, wherein the first computing device transmits instructions to a virtual server management service to instantiate the first bootable base machine image.

16. The system of claim 13, wherein the first computing device transmits, to the first instantiation of the configuration manager, configuration information for the first virtual server, the configuration information selected based upon a source IP address or key of the first virtual server.

17. The system of claim 13, wherein the first configuration information comprises at least one script.

18. The system of claim 17, wherein the script comprises executable instructions for downloading at least one file.

19. The method of claim 17, wherein the configuration information comprises at least one attached file.

20. The system of claim 13, further comprising a display, in communication with the first computing device, which displays a user interface, the user interface accepting input from a user specifying the bootable subset of desired virtual server capabilities.

21. The system of claim 13, further comprising a display, in communication with the first computing device, which displays a user interface, the user interface accepting input of the first configuration information to be transmitted to the first virtual server.

* * * * *